United States Patent [19]

Cook et al.

[11] Patent Number: 4,621,405
[45] Date of Patent: Nov. 11, 1986

[54] DRIVE MECHANISM FOR THE MAIN SPINDLE OF A ROTATING TOOL TURRET MACHINE

[75] Inventors: Peter H. Cook, Wivenhoe; Derek W. Hillyard, Colchester, both of England

[73] Assignee: The 600 Group Public Limited Company, Middlesex, England

[21] Appl. No.: 527,083

[22] Filed: Aug. 29, 1983

[30] Foreign Application Priority Data

Sep. 3, 1982 [GB] United Kingdom ............... 8225097

[51] Int. Cl.⁴ ............................................. B23B 19/02
[52] U.S. Cl. ................................. 29/48.5 R; 29/27 C; 29/38 B; 74/396; 74/425; 82/28 B; 409/221
[58] Field of Search .................. 82/28 B, 34 A, 34 B, 82/34 C, 34 D, 28 R, 29 B; 409/231, 232, 230, 204, 145, 218, 221; 408/134; 74/396, 425; 29/27 C, 38 B, 48.5 R, 48.5 A

[56] References Cited

U.S. PATENT DOCUMENTS

| 737,996 | 9/1903 | Bullard | 74/396 |
| 772,894 | 10/1904 | LeBlond et al. | 74/396 |
| 1,072,282 | 9/1913 | Waninger | 74/396 |
| 1,077,354 | 11/1913 | Lemay | 74/396 X |
| 1,327,129 | 1/1920 | Wolff | 74/396 X |
| 1,373,193 | 3/1921 | Lumsden | 409/204 X |
| 2,221,577 | 11/1940 | Dinkel | 409/218 X |
| 2,704,391 | 3/1955 | Johnson | 29/48.5 R X |
| 3,429,201 | 2/1969 | Zucchellini | 74/396 X |
| 3,483,767 | 12/1969 | Schaite | 82/28 B X |
| 3,811,335 | 5/1974 | Hunsberger | 74/425 X |
| 4,104,500 | 8/1978 | Wyss | 409/231 X |
| 4,185,336 | 1/1980 | Gilbert | 29/38 B |
| 4,215,592 | 8/1980 | Calvert | 74/425 X |
| 4,266,893 | 5/1981 | Troger et al. | 409/231 X |

FOREIGN PATENT DOCUMENTS 423412  2/1963  Switzerland ...................... 82/34 A Primary Examiner—Gil Weidenfeld
Assistant Examiner—Glenn L. Webb
Attorney, Agent, or Firm—Reising, Ethington, Barnard, Perry & Milton

[57] ABSTRACT

A drive mechanism for the main spindle of a rotating tool turret machine, including a drive motor driving a worm carried in an eccentric mounting, rotation of the mounting effecting movement of the worm in an arcuate path into or out of engagement with a worm wheel.

1 Claim, 4 Drawing Figures

DRIVE MECHANISM FOR THE MAIN SPINDLE OF A ROTATING TOOL TURRET MACHINE

INTRODUCTION

This invention relates to a drive mechanism for the main spindle of a rotating tool turret machine, sometimes known as a turning center.

PRIOR ART

It is well known in existing rotating tool turret machines for there to be provided, apart from the main drive motor for driving the main spindle, an auxiliary drive, frequently a motor, sometimes known as the "C"-axis drive, for also driving the main spindle. This auxiliary drive is used for indexing and controlling rotational positioning of the main spindle and hence the work, prior to and during machining operations being performed.

It is also known for the transmission from the auxiliary drive motor to the main spindle being effected through a worm and worm wheel mechanism. This type of mechanism is particularly suitable because it gives the desired reduction ratio in which reductions of 50 to 1 are appropriate. The mechanism also gives the desired accuracy of rotational positioning of the main spindle and the mechanism has good holding torque characteristics.

In certain types of machining, for example, milling, it is appropriate to have a running clearance between the worm and the worm wheel, whereas in other types of machining, for example, drilling or boring, a tight engagement between the worm and worm wheel, with no slack, is desirable.

In previous constructions, the worm and worm wheel are continuously in engagement and disengagement of the mechanism from the main spindle is achieved through a clutch.

OBJECT OF THE INVENTION

It is the main object of this invention to provide an auxiliary drive for the main spindle of a rotating tool turret machine which does not need to be clutched.

STATEMENTS OF INVENTION

According to the present invention there is provided a drive mechanism for the main spindle of a rotating tool turret machine, including a drive motor adapted to drive a worm in engagement with a worm wheel of the main spindle, characterised in that the worm is adjustable into or out of engagement with the worm wheel.

The invention further includes the drive mechanism as above, in which the worm is adjustable in an arcuate path and is carried in an eccentric mounting, engagement and disengagement of the worm and the worm wheel being effected by rotation of the mounting.

DRAWINGS

SPECIFIC DESCRIPTION

Figure 1:
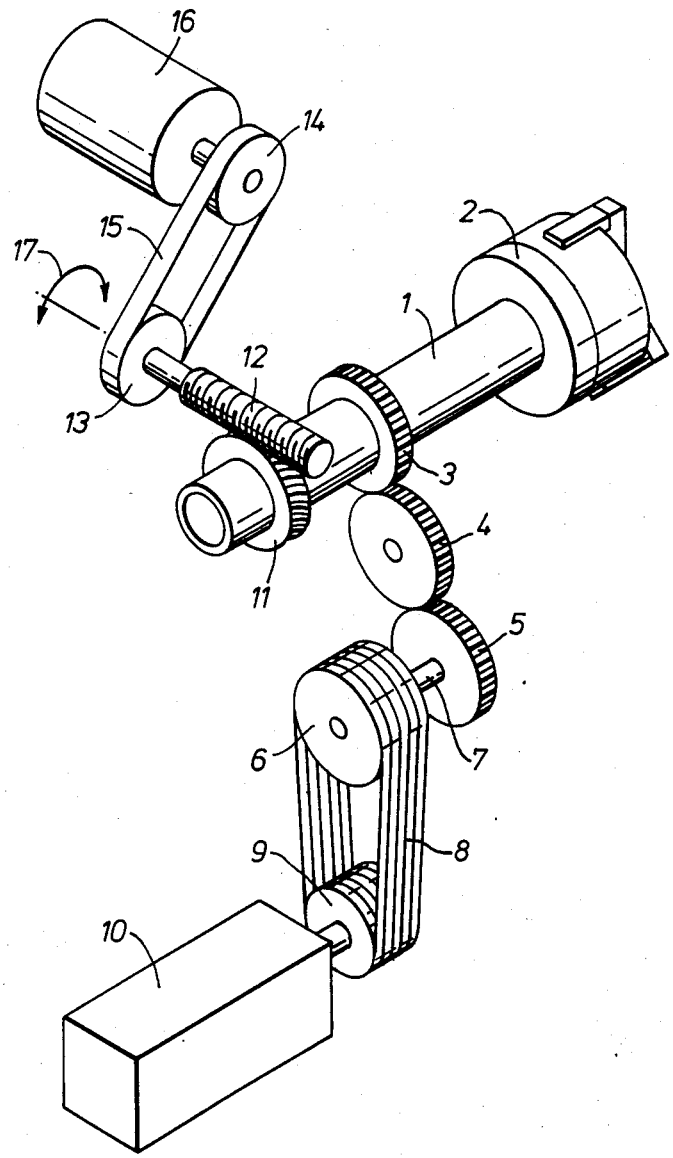
FIG. 1 is a schematic perspective view of a drive mechanism constructed in accordance with the invention.

Referring to the drawings, there is provided a main spindle 1 of a rotating tool turret machine having a chuck 2 or other workholding device fixed thereon and being driven through gears 3, 4 and 5 through pulley 6 mounted on shaft 7 through belting 8 and pulley 9 from main drive motor 10. This main drive mechanism is conventional.

Also mounted on main spindle 1 is a worm wheel 11 driven, when the main drive is not in use, by a worm 12 carried in an eccentric mounting (shown in FIGS. 3 and 4) and driven via pulleys 13 and 14 by belting 15 from auxiliary drive motor 16 sometimes known as the "C"-axis drive motor. Because of the manner of the mounting of worm 12, it is adjustable in an arcuate path indicated by the arrows 17 in FIGS. 1 and 3.

The degree of slack between worm 12 and worm wheel 11 may readily be adjusted by rotation of the eccentric mounting of worm 12 in the directions indicated by arrows 17. Also, worm wheel 11 can be disengaged from worm 12 when it is desired to drive main spindle 1 from the main drive motor 10.

Figure 2:
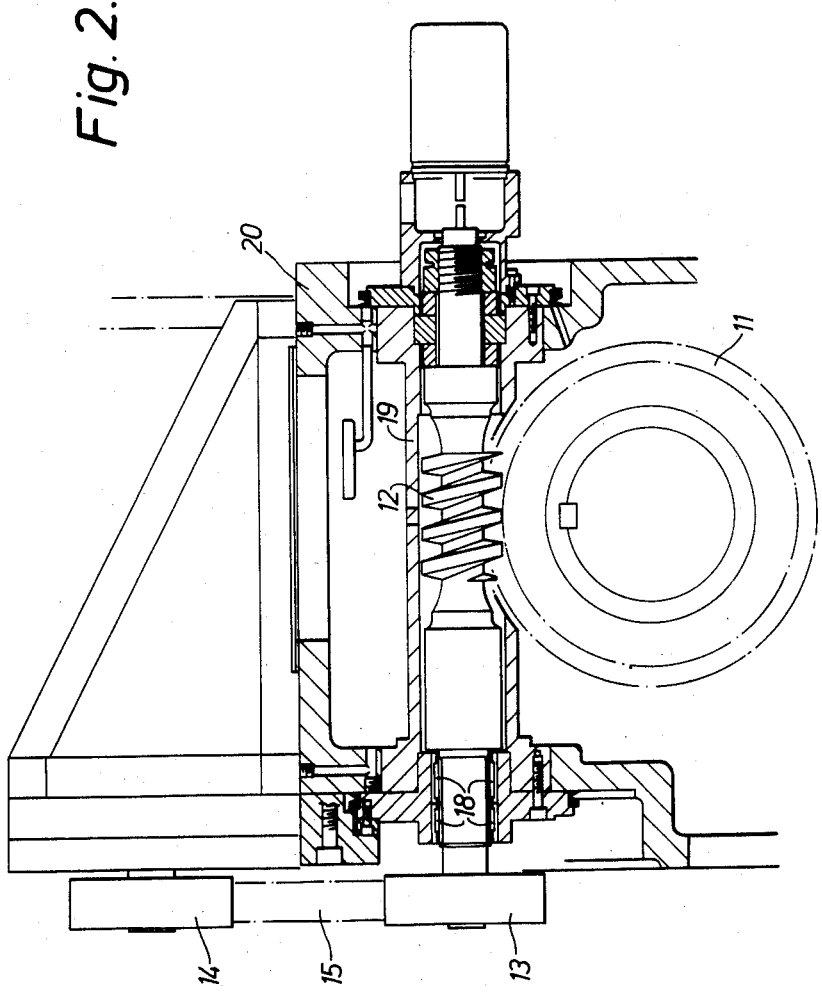
FIG. 2 is a longitudinal part sectional view through the worm and worm wheel assembly of FIG. 1.
Figure 3:
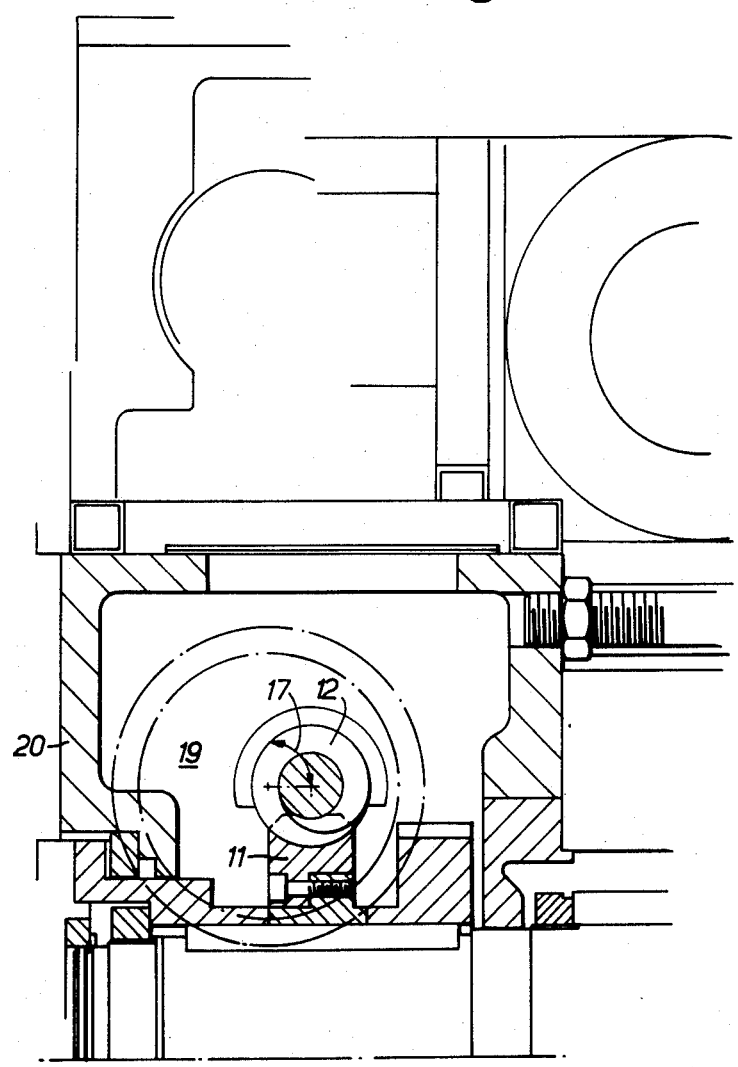
FIG. 3 is an end view of FIG. 2.
Figure 4:
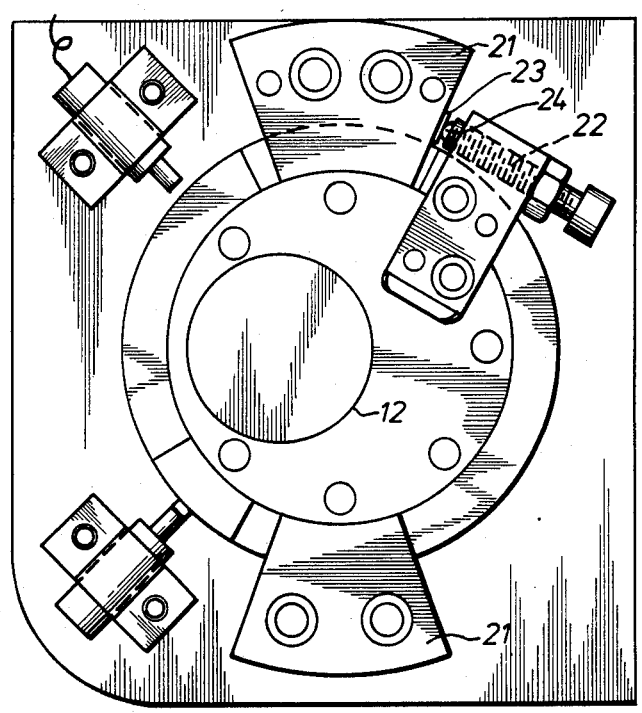
FIG. 4 is a view from the other end of FIG. 2.

Referring particularly to FIGS. 2 and 3, the worm 12 is mounted in needle bearings 18 at both ends and rotates within bush 19 in which it is eccentrically mounted. The bush 19 is rotatable, to move worm 12 into and out of engagement with worm wheel 11, in housing 20.

The rotation of bush 19 is limited by stops 21 (see FIG. 4) on housing 20 being met by adjustable screws 22 (only one of which is shown). Fine adjustment of the limits of movement of the bush 19 is achieved by engagement of a carbide insert 23 being contacted by a ball 24 in the tip of screws 22.

The mechanism of the invention avoids the necessity of clutching the auxiliary drive.

We claim:

1. A drive mechanism for the main spindle for a rotating tool turret machine, including a worm, a worm wheel, and a drive motor for driving said worm in engagement with said worm wheel of the main spindle, said worm being adjustable into and out of engagement with the worm wheel, adjustable shifting means including a bush for adjustably shifting said worm in an arcuate path and including an eccentric mounting whereby engagement and disengagement of said worm and said worm wheel is affected by rotation of said shifting means, stop means for limiting the rotation of said shifting means, and fine adjustment means for adjusting the position of said stop means relative to said shifting means, said fine adjustment means including a carbide insert mounted on said stop means and a screw supported by said shifting means having a ball engaged between said screw and said carbide insert.

* * * * *